US 8,750,104 B2

(12) United States Patent
Park

(10) Patent No.: US 8,750,104 B2
(45) Date of Patent: Jun. 10, 2014

(54) METHOD FOR PERFORMING HARQ OPERATION IN WIRELESS COMMUNICATION SYSTEM

(75) Inventor: Hyung Ho Park, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 574 days.

(21) Appl. No.: 12/936,974

(22) PCT Filed: Apr. 10, 2009

(86) PCT No.: PCT/KR2009/001850
§ 371 (c)(1),
(2), (4) Date: Jul. 18, 2011

(87) PCT Pub. No.: WO2009/125994
PCT Pub. Date: Oct. 15, 2009

(65) Prior Publication Data
US 2011/0310784 A1    Dec. 22, 2011

Related U.S. Application Data

(60) Provisional application No. 61/044,044, filed on Apr. 10, 2008.

(51) Int. Cl.
*H04L 1/00* (2006.01)
*H04L 1/18* (2006.01)
*H04W 28/24* (2009.01)

(52) U.S. Cl.
CPC ............ *H04L 1/1819* (2013.01); *H04L 1/1812* (2013.01); *H04W 28/24* (2013.01); *H04L 1/1816* (2013.01)
USPC ............ 370/230; 370/235; 370/312; 370/390

(58) Field of Classification Search
None
See application file for complete search history.

(56) References Cited

U.S. PATENT DOCUMENTS

| | | | |
|---|---|---|---|
| 7,978,646 B2 * | 7/2011 | Zangi et al. | 370/328 |
| 2002/0168945 A1 * | 11/2002 | Hwang et al. | 455/69 |
| 2004/0093548 A1 * | 5/2004 | Heo et al. | 714/749 |
| 2005/0201337 A1 * | 9/2005 | Heo et al. | 370/335 |
| 2005/0250497 A1 | 11/2005 | Ghosh et al. | |
| 2005/0259662 A1 * | 11/2005 | Kim et al. | 370/395.4 |
| 2005/0271031 A1 * | 12/2005 | Cho et al. | 370/349 |
| 2007/0177630 A1 * | 8/2007 | Ranta et al. | 370/473 |
| 2007/0183451 A1 | 8/2007 | Lohr et al. | |
| 2008/0080424 A1 | 4/2008 | Torsner et al. | |
| 2008/0095195 A1 * | 4/2008 | Ahmadi et al. | 370/478 |
| 2008/0198788 A1 * | 8/2008 | Lim et al. | 370/315 |
| 2010/0278123 A1 * | 11/2010 | Fong et al. | 370/329 |

* cited by examiner

*Primary Examiner* — Ian N Moore
*Assistant Examiner* — Brian T Le
(74) *Attorney, Agent, or Firm* — Morgan, Lewis & Bockius LLP

(57) ABSTRACT

A method of transmitting acknowledgment/non-acknowledgment (ACK/NACK) of a receiver in a wireless communication system is provided. The method includes: sharing information on an ACK/NACK transmission time with a transmitter through aperiodic signaling; receiving a data packet from the transmitter; and transmitting ACK/NACK for the data packet to the transmitter at the ACK/NACK transmission time.

11 Claims, 7 Drawing Sheets

METHOD FOR PERFORMING HARQ OPERATION IN WIRELESS COMMUNICATION SYSTEM

CROSS-REFERENCE TO RELATED APPLICATIONS

This application claims the benefit of priority of U.S. Provisional application No. 61/044,044 filed on Apr. 10, 2008, which is incorporated by reference in their entirety herein.

BACKGROUND OF THE INVENTION

1. Field of the Invention

The present invention relates to wireless communications, and more particularly, to a method of performing hybrid automatic repeat request (HARQ) in a wireless communication system.

2. Related Art

An electrical and electronics engineers (IEEE) 802.16 wireless communication system provides a high-speed multimedia communication service to users in addition to the conventional voice and packet data communication services. The multimedia communication service is a service for transmitting data packets to a plurality of user equipments (UEs), and is referred to as various terms such as a broadcast/multicast service, a multimedia broadcast multicast service (MBMS), a multimedia and broadcast service (MBS), and a point-to-multipoint service. These terms are used without distinction in the following description.

The broadcast/multicast service is based on Internet protocol (IP) multicast. In this service, UEs receive the same multimedia data by sharing resources required for data packet transmission. Therefore, if a certain number of UEs using the broadcast/multicast service exist in the same cell, resource efficiency can be increased. The broadcast/multicast service operates in two modes, that is, a broadcast mode and a multicast mode. In the broadcast mode, one transmitter transmits data to all receivers on the same network. In the multicast mode, one or more transmitters transmit data to one or more specific receivers. In the multicast mode, an intention to receive data has to be delivered to a network, and group registration and deregistration are supported.

Meanwhile, an error compensation scheme is used to secure communication reliability. Examples of the error compensation scheme include a forward error correction (FEC) scheme and an automatic repeat request (ARQ) scheme. In the FEC scheme, errors in a receiving end are corrected by attaching an extra error correction code to information bits. In the ARQ scheme, errors are corrected through data retransmission. Examples of the ARQ scheme include a stop and wait (SAW) scheme, a go-back-N (GBN) scheme, a selective repeat (SR) scheme, etc. The SAW scheme transmits a frame after determining whether the transmitted frame is correctly received. The GBN scheme transmits N consecutive frames, and if transmission is unsuccessful, retransmits all frames transmitted after an erroneous frame. The SR scheme selectively retransmits only the erroneous frame.

The FEC scheme has an advantage in that a time delay is small and no information is additionally exchanged between a transmitting end and a receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment. To solve such disadvantages, a hybrid automatic repeat request (HARQ) scheme is proposed by combining the FEC scheme and the ARQ scheme. In the HARQ scheme, it is determined whether an unrecoverable error is included in data received by a physical layer, and retransmission is requested upon detecting the error, thereby improving performance.

A receiver using the HARQ scheme basically attempts error correction on received data, and determines whether the data will be retransmitted or not by using an error detection code. The error detection code may be a cyclic redundancy check (CRC). When an error of the received data is detected in a CRC detection process, the receiver transmits a non-acknowledgement (NACK) signal to a transmitter. Upon receiving the NACK signal, the transmitter transmits relevant retransmission data according to an HARQ mode. The receiver receives the retransmission data and then performs decoding by combining the retransmission data with previous data. As a result, reception performance is improved.

The HARQ mode can be classified into a chase combining mode and an incremental redundancy (IR) mode. In the chase combining mode, to obtain a signal-to-noise ratio (SNR), error-detected data is combined with retransmitted data instead of discarding the error-detected data. In the IR mode, additional redundant information is incrementally transmitted with retransmitted data to reduce an overhead resulted from retransmission and to obtain a coding gain.

According to a transmission attribute, the HARQ can be classified into an adaptive HARQ and a non-adaptive HARQ. The transmission attribute includes resource allocation, a modulation scheme, a transport block size, etc. In the adaptive HARQ, depending on changes in a channel condition, transmission attributes are entirely or partially changed by comparing transmission attributes used for retransmission with transmission attributes used for initial transmission. In the non-adaptive HARQ, the transmission attributes used for the initial transmission are persistently used irrespective of the changes in the channel condition.

A HARQ-based retransmission scheme can be classified into a synchronous HARQ and an asynchronous HARQ. The synchronous HARQ retransmits data at a time point known to the transmitter and the receiver. In the synchronous HARQ, signaling required to transmit data such as a HARQ processor number can be reduced. The asynchronous HARQ allocates resources for retransmission at any time point. In the asynchronous HARQ, an overhead occurs due to signaling required for data transmission.

In the process of performing HARQ, a UE may receive different types of data packets. For example, in the process of performing HARQ, the UE may receive an MBMS from a base station (BS). In this case, a problem may arise in that the MBMS collides with ACK/NACK transmission or data retransmission.

SUMMARY OF THE INVENTION

The present invention provides a method of performing hybrid automatic repeat request (HARQ). In particular, the present invention provides a method of performing HARQ, which can be used when a specific service such as a broadcast/multicast service coexists in the process of transmitting data by using HARQ.

According to an aspect of the present invention, a method of transmitting acknowledgment/non-acknowledgment (ACK/NACK) of a receiver in a wireless communication system is provided. The method includes: sharing information on an ACK/NACK transmission time with a transmitter through aperiodic signaling; receiving a data packet from the transmitter; and transmitting ACK/NACK for the data packet to the transmitter at the ACK/NACK transmission time.

In the aforementioned aspect of the present invention, the aperiodic signaling may be performed by using any one of an advance MAP (AMAP) message, a superframe header (SFH), and a non-user specific control channel.

In addition, the aperiodic signaling may be performed when a specific event occurs.

In addition, the specific event may be in association with a multimedia broadcast multicast service (MBMS).

In addition, the ACK/NACK transmission time may be determined based on a ratio of a downlink region to an uplink region within a frame of a time division duplex (TDD) system.

According to another aspect of the present invention, a method of transmitting data by using HARQ of a transmitter in a wireless communication system is provided. The method includes: sharing information on a data retransmission time with a receiver through aperiodic signaling; transmitting a data packet to the receiver; receiving ACK/NACK for the data packet; and retransmitting the data packet to the receiver at the data retransmission time according to a result of receiving the ACK/NACK.

In the aforementioned aspect of the present invention, the aperiodic signaling may be performed by using any one of an AMAP message, an SFH, and a non-user specific control channel.

In addition, the aperiodic signaling may be performed when a specific event occurs.

In addition, the specific event may be in association with an MBMS.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in downlink and uses the SC-FDMA in uplink. IEEE 802.16m is an evolution of IEEE 802.16e.

Although the following description will focus on the IEEE 802.16m for clarity of explanation, the technical features of the present invention are not limited thereto.

Figure 1:
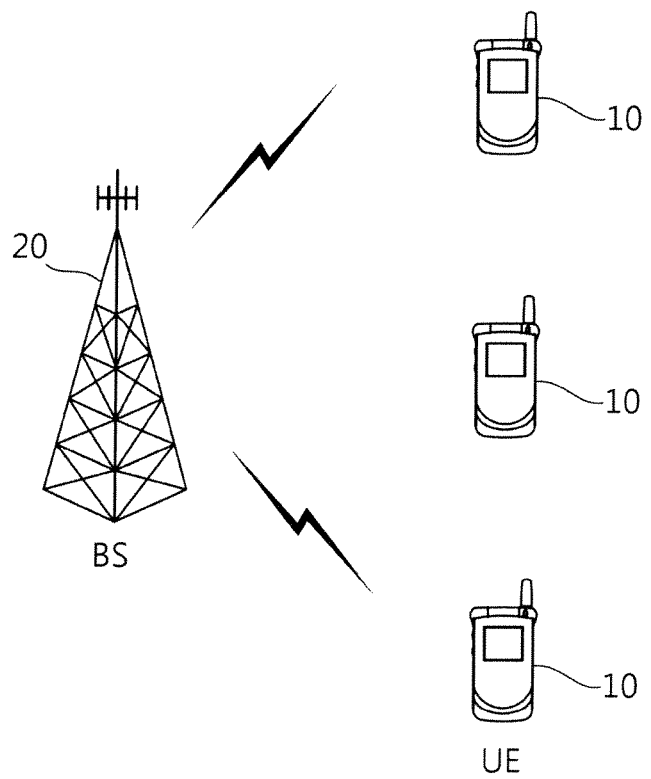
FIG. 1 shows a wireless communication system.

FIG. 1 shows a wireless communication system. Referring to FIG. 1, the wireless communication system includes at least one base station (BS) 20. The BSs 20 provide communication services to specific geographical regions (generally referred to as cells). Each cell can be divided into a plurality of regions (referred to as sectors). A user equipment (UE) 10 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 20 is generally a fixed station that communicates with the UE 10 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 2:
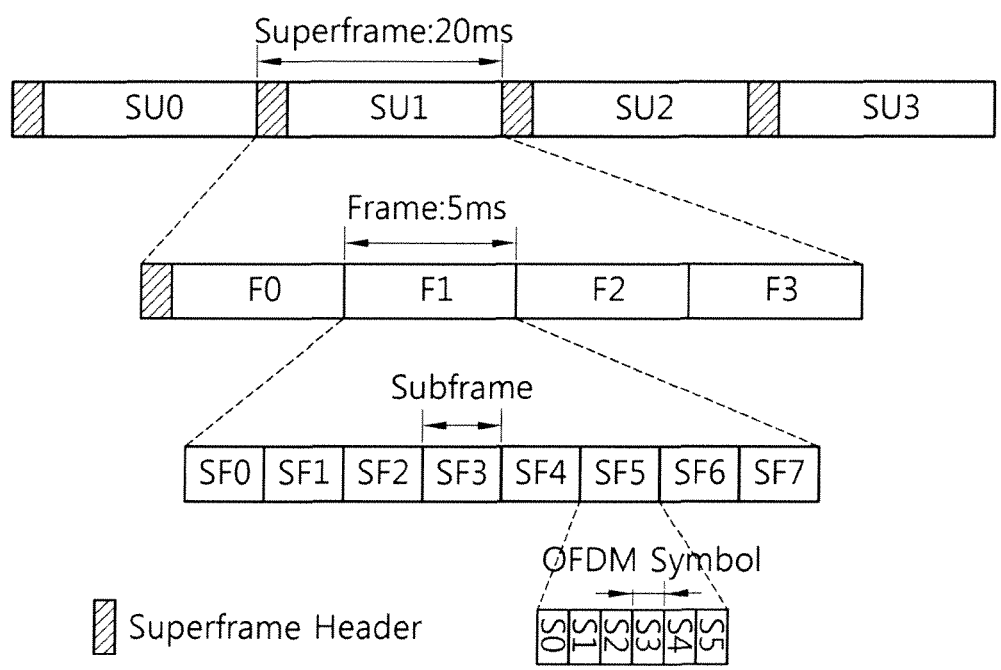
FIG. 2 shows an example of a frame structure.

FIG. 2 shows an example of a frame structure. Referring to FIG. 2, a superframe includes a superframe header and four radio frames F0, F1, F2, and F3. Although it is shown that each superframe has a size of 20 milliseconds (ms) and each frame has a size of 5 ms, the present invention is not limited thereto. The superframe header may be located at a frontmost position of the superframe. A common control channel is assigned to the superframe header. The common control channel is used to transmit information regarding frames constituting the superframe or control information (e.g., system information) that can be commonly utilized by all UEs within a cell.

One frame includes 8 subframes SF0, SF1, SF2, SF3, SF4, SF5, SF6, and SF7. Each subframe can be used for UL or DL transmission. Each subframe may consist of 6 or 7 orthogonal frequency division multiplexing (OFDM) symbols, but this is for exemplary purposes only. Some of the OFDM symbols constituting the subframe may be idle symbols. Time division duplexing (TDD) or frequency division duplexing (FDD) may be applied to the frame. In the TDD, each subframe is used in UL or DL transmission at the same frequency and at a different time. That is, subframes included in a TDD frame are divided into a UL subframe and a DL subframe in a time domain. In the FDD, each subframe is used in UL or DL transmission at the same time and at a different frequency. That is, subframes included in an FDD frame are divided into a UL subframe and a DL subframe in a frequency domain. UL transmission and DL transmission occupy different frequency bands and can be simultaneously performed.

A subframe includes at least one frequency partition. The frequency partition consists of at least one physical resource unit (PRU). The frequency partition may include a localized PRU and/or a distributed PRU. The frequency partition may be used for other purposes such as fractional frequency reuse (FFR) or multicast or broadcast service (MBS).

The PRU is defined as a basic physical unit for allocating resources including a plurality of consecutive OFDM symbols and a plurality of consecutive subcarriers. The number of OFDM symbols included in the PRU may be equal to the number of OFDM symbols included in one subframe. For example, when one subframe consists of 6 OFDM symbols, the PRU may be defined with 18 subcarriers and 6 OFDM symbols. A logical resource unit (LRU) is a basic logical unit for distributed resource allocation and localized resource allocation. The LRU is defined with a plurality of OFDM symbols and a plurality of subcarriers, and includes pilots used in the PRU. Therefore, one LRU includes a specific number of subcarriers, where the specific number depends on the number of allocated pilots.

A logical distributed resource unit (DRU) may be used to obtain a frequency diversity gain. The DRU includes a distributed subcarrier group in one frequency partition. The DRU has the same size as the PRU. One subcarrier is a basic unit of constituting the DRU.

A logical contiguous resource unit (CRU) may be used to obtain a frequency selective scheduling gain. The CRU includes a localized subcarrier group. The CRU has the same size as the PRU.

Figure 3:
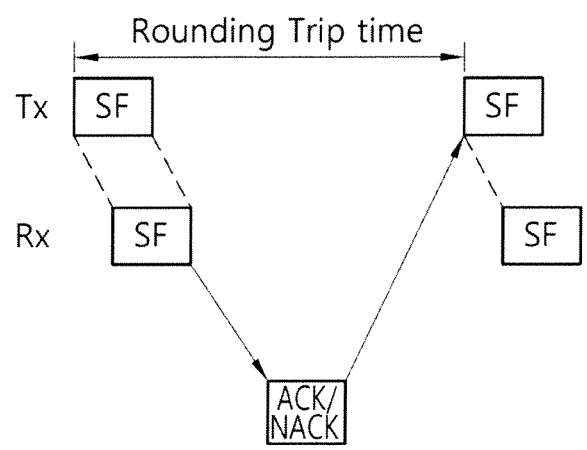
FIG. 3 shows data transmission using hybrid automatic repeat request (HARQ).

FIG. 3 shows data transmission using HARQ. Referring to FIG. 3, data transmission is performed in a transmission time interval (TTI) unit. The TTI is a time for transmitting an encoded packet through a radio interface. The encoded packet is generated in a physical layer. In IEEE 802.16e, one TTI corresponds to one subframe, and data packets are transmitted in one subframe unit by using HARQ. In IEEE 802.16m, one TTI corresponds to an integer multiple of a subframe size, and thus two or more subframes can constitute one TTI. A round trip time (RTT) is defined as a time from when data is transmitted by a transmitter Tx to a time immediately before data is retransmitted upon receiving an acknowledgment/non-acknowledgement (ACK/NACK) signal for the data transmission from a receiver Rx. The RTT includes a processing delay defined as a time required for data processing in the transmitter Tx and the receiver Rx.

In general, a UE and a BS implicitly know in advance an ACK/NACK transmission time for performing HARQ and a data transmission time, or any time is allocated for the UE and the BS. If the UE receives a multimedia broadcast multicast service (MBMS) from the BS in the process of performing HARQ, there may be a problem in that the MBMS collides with ACK/NACK transmission or data retransmission. Since the number of subframes allocated for the MBMS may differ according to situations, there is a need to change the ACK/NACK transmission time for performing HARQ and the data retransmission time.

Figure 4:
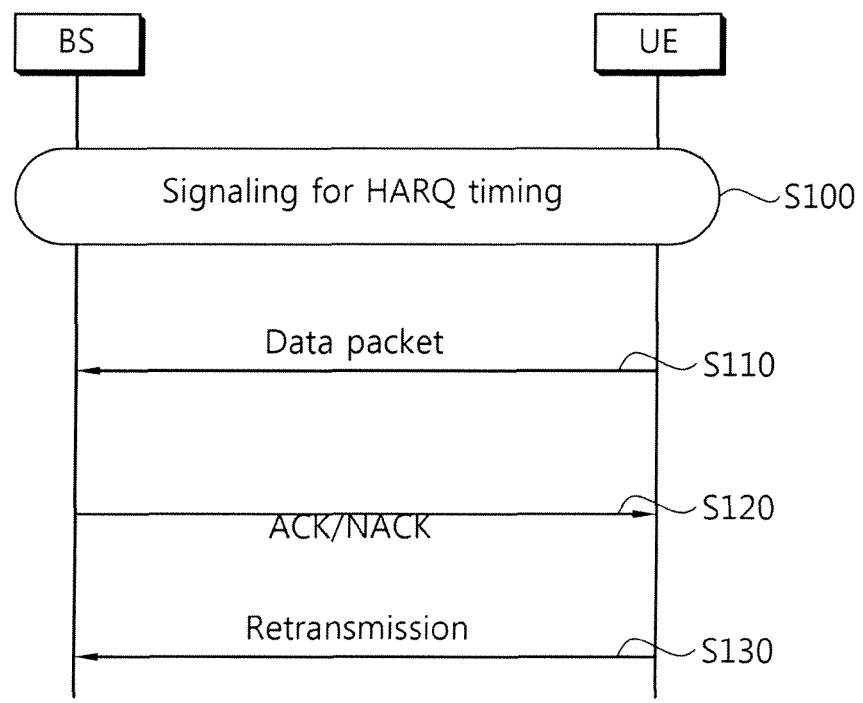
FIG. 4 is a flow diagram showing a data transmission method using HARQ according to an embodiment of the present invention.

FIG. 4 is a flow diagram showing a data transmission method using HARQ according to an embodiment of the present invention. Although UL data transmission is exemplified herein, the present invention is not limited thereto. Thus, the technical features of the present invention can also apply to DL data transmission. In addition, although a TDD system is exemplified herein, the present invention is not limited thereto. Thus, the technical features of the present invention can also apply to an FDD system.

Referring to FIG. 4, a BS and a UE share HARQ timing information through signaling (step S100). The HARQ timing information can include information on an ACK/NACK transmission time and/or information on a data retransmission time. Signaling for sharing the HARQ timing information may be aperiodically performed.

That is, signaling for HARQ timing may be performed when a specific event (e.g., MBMS) occurs in the process of performing HARQ.

The information on the ACK/NACK transmission time may be information on an ACK/NACK delay time or a subframe (or TTI) in which ACK/NACK is transmitted. The ACK/NACK delay time denotes a time ranging from a data packet transmission time to an ACK/NACK transmission time. The ACK/NACK delay time can also be referred to as an ACK channel delay, an ACK/NACK channel delay, etc., but is not limited to these terms. An ACK/NACK delay time $D_{ACK/NACK}$ can be expressed in a multiple of a TTI or a multiple of a subframe size. That is, the ACK/NACK delay time can be expressed by Equation 1 below.

$$D_{ACK/NACK} = k \quad \text{[Equation 1]}$$

Herein, k is a multiple of a TTI or a multiple of a subframe size, and may include '0'. In the TDD system, the ACK/NACK delay time $D_{ACK/NACK}$ may vary according to a ratio of a DL subframe size to a UL subframe size within a frame (hereinafter, simply referred to as a DL/UL ratio). In this case, the ACK/NACK delay time can be expressed by Equation 2 below.

$$D_{ACK/NACK}(DL/UL_{ratio}) = m \quad \text{[Equation 2]}$$

Herein, m is a multiple of a TTI or a multiple of a subframe size, and may include '0'.

The information on the data retransmission time may be information on a retransmission delay time or a subframe (or TTI) in which data is retransmitted. The retransmission delay time denotes a time ranging from an ACK/NACK transmission time to a data packet retransmission time. The retransmission delay time may include a processing delay, a frame alignment, a propagation delay, etc. In the TDD system, a retransmission delay time $D_{Retrans}$ may vary according to the DL/UL ratio. In this case, the retransmission delay time can be expressed by Equation 3 below.

$$D_{Retrans}(DL/UL_{ratio}) = p \quad \text{[Equation 3]}$$

Herein, p is a multiple of a TTI or a multiple of a subframe size, and may include '0'. In the TDD system, the retransmission delay time $D_{Retrans}$ varies according to the DL/UL ratio, and can be expressed by a function including a corresponding subframe index or a corresponding TTI index. In this case, the retransmission delay time can be expressed by Equation 4 below.

$$D_{Retrans}(DL/UL_{ratio}, i) = f \quad \text{[Equation 4]}$$

Herein, f is a multiple of a TTI or a multiple of a subframe size, and may include '0'. In addition, i is a subframe index or a TTI index. In the TDD system, the retransmission delay time $D_{Retrans}$ varies according to the DL/UL ratio, and can be expressed by a function including a TTI index or an HARQ channel identification (ID) index. In this case, the retransmission delay time can be expressed by Equation 5 below.

$$D_{Retrans}(DL/UL_{ratio}, i, i_c) = j \quad \text{[Equation 5]}$$

Herein, j is a multiple of a TTI or a multiple of a subframe size, and may include '0'. In addition, i is a subframe index or a TTI index, and $i_c$ is an HARQ channel ID index.

Signaling for sharing HARQ timing information (e.g., information on an ACK/NACK transmission time and information on a data retransmission time) can be performed by using any one of an advanced MAP (AMAP) message, a superframe header (SFH), and a non-user specific control channel.

The UE transmits a data packet to the BS (step S110). The BS transmits ACK/NACK to the UE (step S120). The NACK is transmitted when an error is detected or an information block cannot be decoded. The ACK is transmitted when the error is not detected and the information block can be decoded. The ACK implies that data is successfully transmitted. The NACK implies that data retransmission is requested. The ACK/NACK is transmitted after an ACK/NACK delay time elapses from a data packet transmission time. The UE and the BS can know the ACK/NACK delay time through singling of step S100. The ACK/NACK is transmitted through an ACK channel. The ACK channel is termed herein for explanation purposes, and thus the term is not limited thereto. The ACK channel can carry at least one ACK/NACK signal, and includes at least one OFDM symbol in a time domain and at least one subcarrier in a frequency domain. A plurality of ACK/NACK signals can be multiplexed for one ACK channel according to frequency division multiplexing (FDM), time division multiplexing (TDM) or code division multiplexing (CDM).

The UE retransmits data to the BS according to the result of step S120 (step S130). If the UE receives ACK from the BS, the UE does not have to retransmit the data to the BS. If the UE receives NACK from the BS or receives no data for a specific time period, the UE retransmits the data to the BS. The UE may retransmit the data to the BS after a retransmission delay time elapses from a NACK transmission time of the BS. The UE and the BS can know the retransmission delay time through signaling of step S100.

Figure 5:
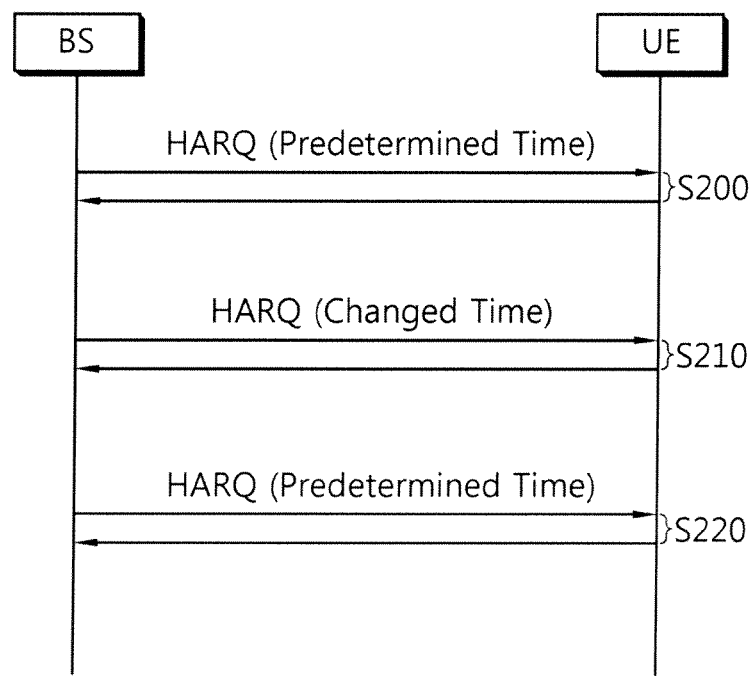
FIG. 5 is a flow diagram showing a method of performing HARQ according to an embodiment of the present invention.

FIG. 5 is a flow diagram showing a method of performing HARQ according to an embodiment of the present invention.

Referring to FIG. 5, a UE and a BS performs synchronous HARQ at a predetermined time (step S200). That is, the UE and the BS implicitly know an ACK/NACK transmission time and a data retransmission time, and performs synchronous HARQ according to the predetermined time.

When a specific event occurs, the UE and the BS performs HARQ at a changed time (step S210). The specific event may collide with the ACK/NACK transmission time or the data retransmission time predetermined in step S200. For example, the specific event may be an MBMS. To avoid collision and to successfully complete data transmission using HARQ, the UE and the BS can change the ACK/NACK transmission time and the data transmission time through signaling. The ACK/NACK transmission time can be expressed with a specific subframe or a specific TTI in which ACK/NACK is transmitted, or can be expressed with a specific delay time from the data transmission time.

The data retransmission time can be expressed with a specific subframe or a specific TTI in which data is retransmitted, or can be expressed by a specific delay time from the data transmission time or the ACK/NACK transmission time.

When the specific event is released, the UE and the BS re-perform synchronous HARQ at the predetermined time (step S220). That is, the UE and the BS perform synchronous HARQ as in step S200.

Figure 6:
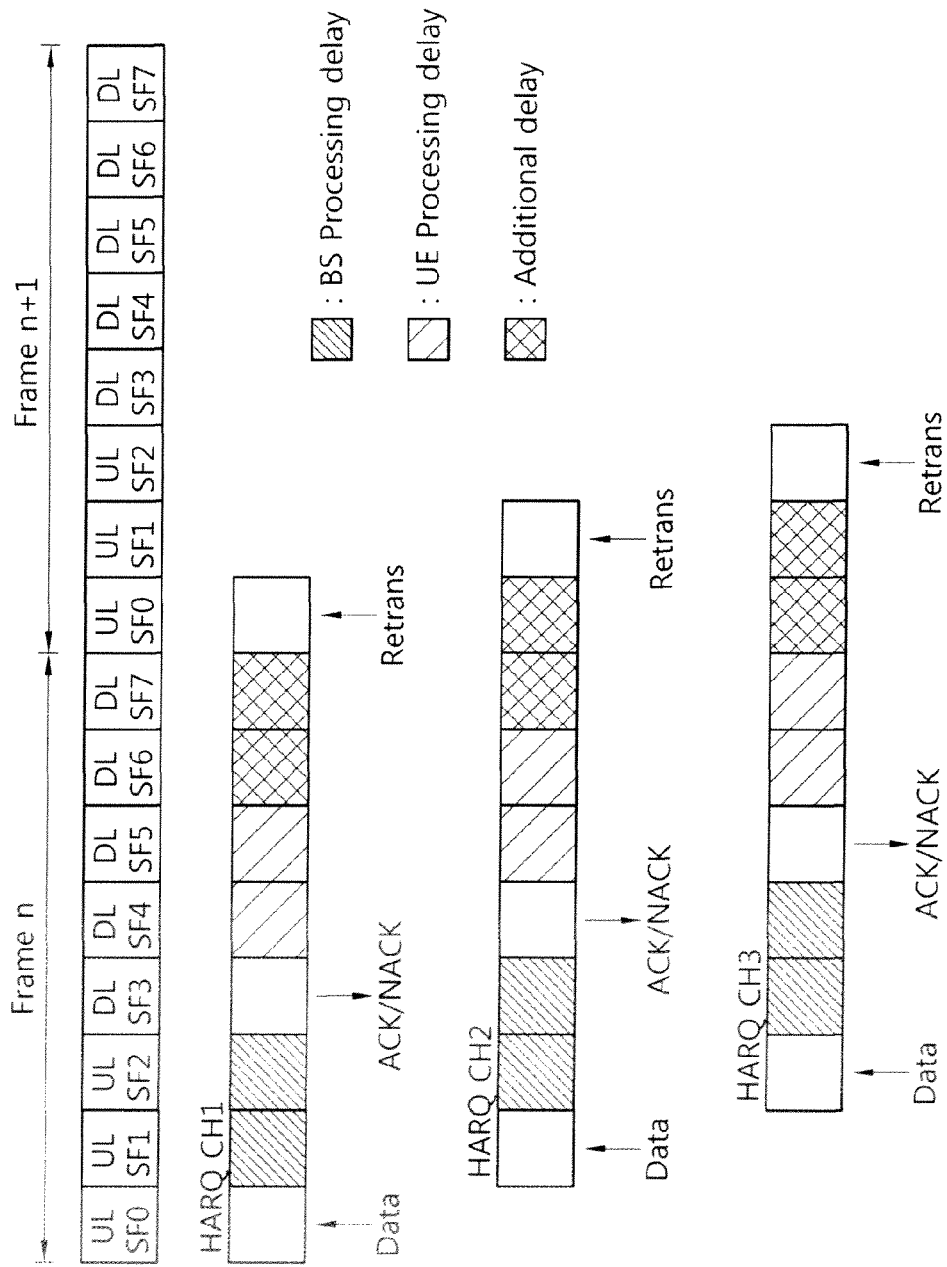
FIG. 6 shows an acknowledgment/non-acknowledgement (ACK/NACK) transmission time and a data retransmission time when data is transmitted using HARQ according to an embodiment of the present invention.

FIG. 6 shows an ACK/NACK transmission time and a data retransmission time when data is transmitted using HARQ according to an embodiment of the present invention. It is assumed hereinafter that, a frame n is consecutive to a frame n+1 in a time domain according to a TDD system, and a DL/UL ratio is 5:3. A group of uplink subframes is referred to as an uplink region, and a group of downlink subframes is referred to a downlink region. However, the technical features of the present invention are not limited thereto, and thus can apply to various cases, for example, when the DL/UL ratio is 4:4, 6:2, etc. In addition, although uplink data transmission is exemplified herein, the technical features of the present invention are not limited thereto, and thus can also apply to downlink data transmission. In downlink data transmission, a transmitter is a BS, and a receiver is a UE. In uplink data transmission, the transmitter is the UE, and the receiver is the BS. The technical features of the present invention can also apply to an FDD system. Referring to FIG. 6, a BS processing delay (i.e., a time required to process data by the BS) is 2 subframes, a UE processing delay (i.e., a time required to process data by the UE) is 2 subframes, and an additional delay for switching from downlink to uplink is 2 subframes. Information on the BS processing delay, the UE processing delay, and the additionally delay can be shared through signaling between the UE and the BS.

On a first HARQ channel, the UE transmits data in uplink through a subframe 0 of the frame n, and the BS transmits ACK/NACK in downlink through a subframe 3 of the frame n after elapsing the BS processing delay corresponding to 2 subframes. In response thereto, the UE retransmits data through a subframe 0 of the frame n+1 after elapsing the UE processing delay corresponding to 2 subframes and the additional delay corresponding to 2 subframes. In this case, an RTT corresponds to 8 TTIs.

On a second HARQ channel, the UE transmits data in uplink through a subframe 1 of the frame n, and the BS transmits ACK/NACK in downlink through a subframe 4 of the frame n after elapsing the BS processing delay corresponding to 2 subframes. In response thereto, the UE retransmits data through a subframe 1 of the frame n+1 after elapsing the UE processing delay corresponding to 2 subframes and the additional delay corresponding to 2 subframes. In this case, an RTT corresponds to 8 TTIs.

On a third HARQ channel, the UE transmits data in uplink through a subframe 2 of the frame n, and the BS transmits ACK/NACK in downlink through a subframe 5 of the frame n after elapsing the BS processing delay corresponding to 2 subframes. In response thereto, the UE retransmits data through a subframe 2 of the frame n+1 after elapsing the UE processing delay corresponding to 2 subframes and the additional delay corresponding to 2 subframes. In this case, an RTT corresponds to 8 TTIs.

In general, the ACK/NACK transmission and the data retransmission time are predetermined in synchronous HARQ. However, if an MBMS is provided in the process of performing HARQ, the number of subframes allocated for the MBMS may vary according to situations. In this case, the UE and the BS cannot perform ACK/NACK transmission and data retransmission at the predetermined time. Therefore, the UE and the BS share new information on the ACK/NACK transmission time and the data retransmission time through signaling.

Figure 7:
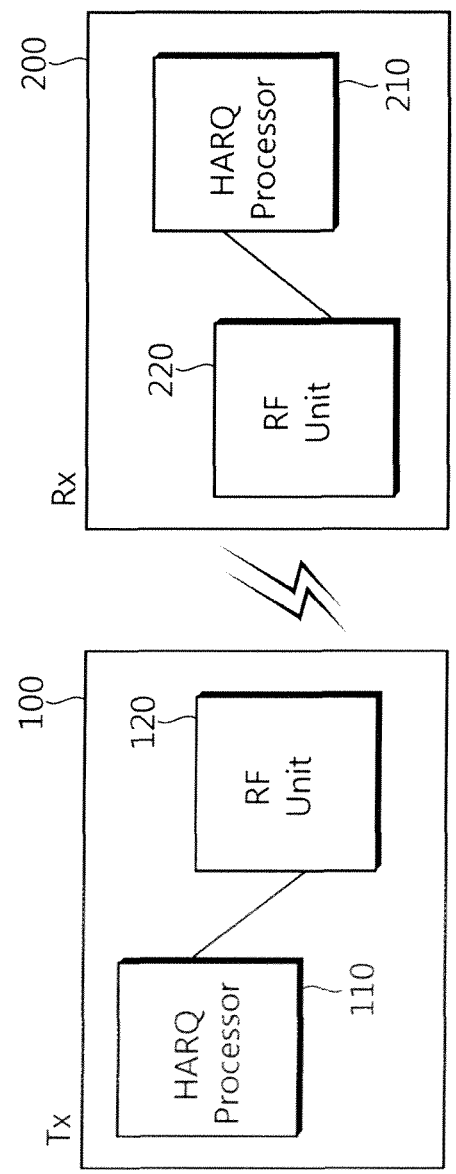
FIG. 7 is a block diagram showing a transmitter and a receiver for implementing a method of performing HARQ described in FIG. 4 to FIG. 6.

FIG. 7 is a block diagram showing a transmitter and a receiver for implementing a method of performing HARQ described in FIG. 4 to FIG. 6.

Referring to FIG. 7, a transmitter 100 includes an HARQ processor 110 and a radio frequency (RF) unit 120, and a receiver 200 includes an HARQ processor 210 and an RF unit 220. The RF unit 120 of the transmitter 100 is connected to the HARQ processor 110 to transmit a radio signal. The RF unit 220 of the receiver 200 is connected to the HARQ processor 210 to receive the radio signal. The HARQ processor of the transmitter 100 shares information on a data transmission time with the receiver through aperiodic signaling, transmits a data packet to the receiver, receives ACK/NACK for the data packet, and retransmits the data packet to the receiver at the data retransmission time according to a result of receiving the ACK/NACK. The HARQ processor 210 of the receiver 200 shares information on an ACK/NACK transmission time with the transmitter through aperiodic signaling, receives a data packet from the transmitter, and transmits ACK/NACK for the data packet to the transmitter at the ACK/NACK transmission time.

According to the present invention, an acknowledgment/non-acknowledgement (ACK/NACK) transmission time and a data transmission time can be changed to reduce collision which may occur when a specific service such as a multimedia broadcast multicast service (MBMS) coexists in the process of performing hybrid automatic repeat request (HARQ).

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting an acknowledgment/non-acknowledgment (ACK/NACK) of a receiver in a wireless communication system, the method comprising:
   sharing information on an ACK/NACK transmission time including information on an ACK/NACK delay time with a transmitter through aperiodic signaling when multimedia broadcast multicast service (MBMS) occurs, MBMS being a service for transmitting common data packets to a plurality of user equipments (UEs);
   receiving a receiver-specific data packet from the transmitter; and
   transmitting an ACK/NACK for the receiver-specific data packet to the transmitter based on the information on the ACK/NACK delay time,
   wherein the information on the ACK/NACK delay time indicates a delay for a pre-configured time ranging from a transmission time of the receiver-specific data packet to a transmission time of the ACK/NACK with respect to the receiver-specific data packet to avoid a collision between the common data packets of the MBMS and the ACK/NACK with respect to the receiver-specific data packet.

2. The method of claim 1, wherein the aperiodic signaling is performed by using one of an advance MAP (A-MAP) message, a superframe header (SFH), and a non-user specific control channel.

3. The method of claim 1, wherein the ACK/NACK delay time is expressed in a multiple of a transmission time interval (TTI) or a multiple of a subframe size.

4. The method of claim 1, wherein the ACK/NACK delay time is determined based on a ratio of a downlink region to an uplink region within a frame in a time division duplex (TDD) system.

5. A method of transmitting data by using hybrid automatic repeat request (HARM) of a transmitter in a wireless communication system, the method comprising:
   sharing information on a data retransmission time including information on a retransmission delay time with a receiver through aperiodic signaling when multimedia broadcast multicast service (MBMS) occurs, MBMS being a service for transmitting common data packets to a plurality of user equipments (UEs);
   transmitting a receiver-specific data packet to the receiver;
   receiving an acknowledgment/non-acknowledgment (ACK/NACK) for the receiver-specific data packet; and
   retransmitting the receiver-specific data packet to the receiver based on the information on the retransmission delay time according to a result of receiving the ACK/NACK,
   wherein the information on the retransmission delay time indicates a delay for a pre-configured time ranging from a transmission time of the ACK/NACK to a retransmission time of the receiver-specific data packet to avoid a collision between the common data packets of the MBMS and the receiver-specific data packet.

6. The method of claim 5, wherein the aperiodic signaling is performed by using one of an advance MAP (A-MAP) message, a superframe header (SFH), and a non-user specific control channel.

7. The method of claim 5, wherein the retransmission delay time is expressed in a multiple of a transmission time interval (TTI) or a multiple of a subframe size.

8. The method of claim 5, wherein the retransmission delay time includes at least one of a processing delay, a frame alignment, and a propagation delay.

9. The method of claim 5, wherein the retransmission delay time is determined based on a ratio of a downlink region to an uplink region within a frame in a time division duplex (TDD) system.

10. The method of claim 5, wherein the retransmission delay time is determined based on a subframe index or a TTI index.

11. The method of claim 5, wherein the retransmission delay time is determined based on an HARQ channel identifier (ID).

* * * * *